United States Patent [19]

Tompkins et al.

[11] Patent Number: 5,705,444
[45] Date of Patent: Jan. 6, 1998

[54] FILTER MATERIAL OF CERAMIC OXIDE FIBERS AND VERMICULITE PARTICLES

[75] Inventors: Thomas L. Tompkins, Woodbury; Edward M. Fischer, White Bear Lake; Timothy J. Gennrich, Lake Elmo; Steven R. Paulson, Stacy, all of Minn.

[73] Assignee: Minnesota Mining & Manufacturing Company, St. Paul, Minn.

[21] Appl. No.: 670,462

[22] Filed: Jun. 26, 1996

Related U.S. Application Data

[63] Continuation-in-part of Ser. No. 643,667, May 6, 1996, abandoned.

[51] Int. Cl.$^6$ .................................................. B32B 5/16
[52] U.S. Cl. ........................... 442/76; 442/104; 442/417
[58] Field of Search ............................. 442/76, 104, 417

[56] References Cited

U.S. PATENT DOCUMENTS

| | | |
|---|---|---|
| Re. 35,143 | 1/1996 | Funkenbusch et al. . |
| 3,795,524 | 3/1974 | Sowman . |
| 3,884,659 | 5/1975 | Ray . |
| 4,047,965 | 9/1977 | Karst et al. . |
| 4,166,147 | 8/1979 | Lange et al. . |
| 4,398,931 | 8/1983 | Shevlin . |
| 4,445,106 | 4/1984 | Shah . |
| 4,543,113 | 9/1985 | Forester et al. . |
| 4,613,350 | 9/1986 | Forester et al. . |
| 4,732,879 | 3/1988 | Kalinowski et al. . |
| 4,954,462 | 9/1990 | Wood . |
| 4,970,097 | 11/1990 | Kalinowski . |
| 5,102,464 | 4/1992 | Ou .................................................. 106/415 |
| 5,348,918 | 9/1994 | Budd et al. . |
| 5,380,580 | 1/1995 | Rogers et al. . |

FOREIGN PATENT DOCUMENTS

| | | |
|---|---|---|
| A1 0095308 | 11/1983 | European Pat. Off. . |
| A2 0146497 | 6/1985 | European Pat. Off. . |

OTHER PUBLICATIONS

ASTM "Standard Test Method for Folding Endurance of Paper by the M.I.T. Tester$_1$," Published Aug. 1989.
ASTM "Standard Test Method for Air Permeability of Textile Fabrics," Published Aug. 1975.
Product Brochure "MicroLite®," *Grace Contruction Products*, Feb., 1993.
Product Brochure "MicroLite® Vermiculite Dispersions Abrasion Resistance," *Grace Construction Products*, Feb. 1993.

*Primary Examiner*—Christopher Raimund
*Attorney, Agent, or Firm*—Walter N. Kirn, Jr.; Gary L. Griswold; Gregory D. Allen

[57] ABSTRACT

Filter material comprising fabric of ceramic oxide fibers and vermiculite particulate is disclosed. The presence of the vermiculite provides an improvement in the flexural endurance of the fabric.

22 Claims, No Drawings

FILTER MATERIAL OF CERAMIC OXIDE FIBERS AND VERMICULITE PARTICLES

This application is a continuation-in-part of U.S. application Ser. No. 08/643,667, filed May 6, 1996, now abandoned.

FIELD OF THE INVENTION

The present invention relates to a filter material comprising fabric of ceramic oxide fibers and vermiculite particulate. The filter material can be incorporated, for example, into filter bag, pleated filter cartridge, and molded or pressed filter constructions.

DESCRIPTION OF RELATED ART

It is generally known that fiberglass fabrics and (crystalline) ceramic fabrics can be employed in filter bags for use at higher temperatures than filter bags made of polymeric fibers. A drawback associated with fiberglass filter fabrics is the need to protect the fibers from self abrasion (i.e. abrasion resulting from fibers rubbing together) and abrasion by material being filtered (e.g., dust). Abrasions on the surface of the glass fibers cause a decrease in the strength of the fiber.

Further, periodic cleaning of the bags, for example, by periodic pulses or blasts of air, or by mechanical shaking, results in substantial fiber to fiber contact, and fiber flexing. Under such conditions, fiberglass filter bags would quickly fail. Although it is common in the industry to address the fiber abrasion problem by coating the fibers with polytetrafluoroethylene, the usefulness of such coating is limited by the decomposition temperature of the polytetrafluoroethylene, which is about 260° C. (500° F.).

There are industry needs, however, for filtering gas streams at temperatures in excess of 260° C. (500° F.). Crystalline ceramic metal oxide fiber filter bags have been developed for such applications and are recommended for use up to about 760° C. (1400° F.). The typical cost of the crystalline ceramic metal oxide fibers, however, has impacted and limited their use in such applications.

More than one year prior to the filing of the present application, the assignee showed a vermiculite coated fabric having a gas permeability of zero $l/min/cm^2$ (zero $l/dm^2 \cdot min$) to at least one third party. The woven (5-harness satin weave) fabric was a 50:50 by volume blend of 11 diameter aluminoborosilicate fiber (available from the 3M Company under the trade designation "NEXTEL 312" and magnesium aluminosilicate glass fiber (available under the trade designation "S2 GLASS" from Owens-Corning Fiberglas Corp. The intended use of the vermiculite-coated fabric was as a gas tight fire barrier.

SUMMARY OF THE INVENTION

The present invention provides a filter material comprising fabric of ceramic (metal, including Si) oxide fibers and vermiculite particulate, the fibers collectively having an outer surface (i.e., each fiber has an outer surface, and the sum of these outer surfaces provides a "collective" outer surface), at least a portion of the outer surface being covered by a sufficient amount of vermiculite particulate such that the filter material has an increased flexural endurance over the fabric without the presence of the vermiculite, of at least 100 percent (preferably at least 200 percent, more preferably at least 500 percent, and most preferably at least 1000 or even at least 5000 percent), the filter material having a gas permeability of at least 0.15 $l/min/cm^2$ (preferably at least 0.3 l/min/cm2).

For most fiber fabric applications, the filter material according to the present invention preferably has a gas permeability of less than 2 $l/min/cm^2$ (200 $l/dm^2 \cdot min$; 33.3 $cm^3/sec/cm^2$; 2000 $cm^3/min/cm^2$; 65 $CFM/ft^2$), more preferably less than 1.5 $l/min/cm^2$, and most preferably less than 0.8 $l/min/cm^2$. In general, for most fiber fabric applications, the filter material according to the present invention preferably has a gas permeability in the range from 0.15 to 2 $l/min/cm^2$, more preferably, 0.30 to 1.5 $L/min/cm^2$, and most preferably, 0.3 to 0.8 $l/min/cm^2$.

Preferably, the filter material according to the present invention has the increased flexure properties even after exposure to temperatures of about 315° C. (preferably about 538° C.) for at least seven days, preferably at least one year. In certain preferred embodiments of the present invention, the ceramic oxide fibers are glass fibers made of glass having a softening point in the range from about 600 ° C. to about 875° C., more preferably in the range from about 750° C. to about 875° C. In this application:

"ceramic" refers to crystalline ceramics, glasses, and glass-ceramics;

"gas permeability" refers to the average of four gas permeability values which are determined as described in the working examples;

"$l/min/cm^2$" refers to liters per minute per centimeter squared;

"$l/dm^2$-min" refers to liters per decimeter squared-minute;

"$cm^3/sec/cm^2$" refers to cubic centimeters per second per centimeter squared";

"$cm^3/min/cm^2$" refers to cubic centimeters per minute per centimeter squared;

"$CFM/ft^2$" refers to cubic feet per minute per foot squared";

"softening point" refers to the temperature at which a glass in the form of a 0.235 mm long fiber having a 0.55–0.75 mm diameter, at a heating rate of 5° C./min, elongates at a rate of 1 mm/min under its own weight;

"fiber" refers to a filament structure having a length of at least 100 times its diameter;

"continuous fiber" refers to a fiber which as infinite length compared to its diameter (see, e.g., U.S. Pat. No. 4,047,965 (Karst et al.), the disclosure of which is incorporated herein by reference);

"flexural endurance" is determined as described in the working examples section below; and "filter bag" refers to a filter material in the form of a tube open on at least one end, which may be seamless but preferably has a seam.

The filter material according to the present invention can be incorporated into conventional filter constructions including filter bags, pleated filter cartridges, and molded or pressed filters.

DESCRIPTION OF PREFERRED EMBODIMENTS

The fabric of ceramic oxide fibers can, for example, be woven, (e.g., with plain weave, twill weave, drill weave, satin weave, etc.), braided, knitted, or non-woven. Suitable fabrics for making the filter material according to the present invention include those employing alumina fibers, titania fibers, silica fibers and zirconia fibers. Useful fabric is available, for example under the trade designation "DUST FILTRATION FABRICS" from Burlington Glass Fabric Co. of Greensboro, N.C.

The fabric can also be made by techniques known in the art. For example, woven fabric can be formed using a loom to interlace warp (lengthwise) yarns with filling (crosswise) yarns. Knitted fabric can be constructed using a needle(s) to interloop yarn or fiber loops. Braided fabric can be made by intertwining fibers or yarns with a braiding machine to provide tubular structure.

Non-woven ceramic metal oxide fiber fabric, which has no predetermined intertwining or pattern of fibers or yarns, can be formed from non-continuous fibers or yarns using paper processing methods or air laying methods. The strength and integrity of non-woven ceramic oxide (fiber) fabrics may be increased by the presence of organic (e.g., polyvinyl acetate, polyvinyl alcohol, polyvinyl pyrrolidone, and polyethylene glycol) or inorganic (e.g., colloidal silica) binders, or by entangling the fibers by needle-punching, hydro-entanglement or air entanglement, or by stitch-bonding. For further details regarding methods for making non-woven fabrics see, for example, U.S. Pat. No 5,380,580 (Rogers et al.), the disclosure of which is incorporated herein by reference.

Fibers used to make fabric are typically available in continuous tows (also referred to as rovings (i.e., an assembly of one or more strands of ceramic fibers without twist) or yarns. Useful continuous ceramic metal oxide fibers include aluminosilicate, aluminoborosilicate fibers, alumina fibers, titania fibers, and zirconia fibers. Preferred aluminosilicate fibers, which are typically crystalline, comprise by weight, on a theoretical oxide basis, $Al_2O_3$ in the range from about 67 to about 77 percent, and $SiO_2$ in the range from about 33 to about 23 percent. Sized aluminosilicate fibers are available, for example, under the trade designations "NEXTEL 550" and "NEXTEL 720" from the 3M Company of St. Paul, M.N.

Aluminoborosilicate fibers preferably comprise by weight, on a theoretical oxide basis, $Al_2O_3$ in the range from about 55 to about 75 percent, $SiO_2$ in the range from less than about 45 to greater than zero (preferably, less than 44 to greater than zero) percent, and $B_2O_3$ in the range from less than 25 to greater than zero percent (preferably, about 1 to about 5%). The aluminoborosilicate fibers preferably are at least 50 percent by weight crystalline; more preferably, at least 75 percent; and most preferably, about 100%. Sized aluminoborosilicate fibers are available, for example, under the trade designations "NEXTEL 312" and "NEXTEL 440" from the 3M Company. Preferred alumina fibers are alpha-alumina fibers available, for example, under the trade designation "NEXTEL 610" from the 3M Company. Fabrics made from these fibers are also commercially available.

Further, suitable aluminosilicate fibers, aluminoborosilicate fibers, and alumina fibers, can be made by techniques known in the art including those disclosed in U.S. Pat. Nos. 3,795,524 (Sowman), 4,047,965 (Karst et at.), and 4,954, 462 (Wood et al.), the disclosures of which are incorporated herein by reference. Useful zirconia fibers, yttria-alumina fibers, and titania fibers can be made as described, for example, in U.S. Pat. Nos. 35,143 (Funkenbusch, et al), 5,348,918 (Budd et al.), and 4,166,147 (Lange, et al), respectively, the disclosures of which are incorporated herein by reference.

Preferred glass fibers include magnesium aluminosilicate glass fibers such as those available under the trade designation "S2-GLASS" (softening point of about 860° C.) from Owens-Corning Fiberglas Corp. of Granville, Ohio. Such preferred glass fibers comprise by weight, on a theoretical oxide basis, $SiO_2$ in the range from about 64 to about 66 percent, $Al_2O_3$ in the range from about 24 to about 26 percent, MgO in the range from about 9 to about 11 percent, and other oxides such as CaO, $Na_2O$, $K_2O$, and $Fe_2O_3$. Another preferred glass fiber is a silicate fiber available, for example, under the trade designation "E GLASS" (softening point of about 846° C. from Owens-Corning Fiberglas Corp. This latter fiber comprises by weight, on a theoretical oxide basis, $SiO_2$ in the range from about 52 to about 56 percent, $Al_2O_3$ in the range from about 12 to about 16 percent, CaO in the range from about 16 to about 25 percent, up to about 5 percent MgO, $B_2O_3$ in the range from about 5 to about 10 percent, and other additives such as $Na_2O$, $K_2O$, $TiO_2$, and $Fe_2O_3$. Further, quartz fibers are available, for example, under the trade designation "ASTROQUARTZ" from J. P. Stevens, Inc., of Slater, N. C.

Ceramic metal oxide fibers also are available as "mineral wool" fibers, which tend to be short, fine diameter (i.e., 2–3.5 micrometers) fibers. Mineral wool fibers can be employed in the fabric, particularly when combined with other, longer, fibers (e.g., the continuous alumina, aluminosilicate, or aluminoborosilicate fibers described above). Mineral wool fibers, which are typically aluminosilicate, are spun from molten material. Such fibers are available, for example, under the trade designations "FIBERFRAX" from Carborundum Co., Niagara Falls, N.Y., and "CERWOOL" from Premier Refractories and Chemicals, Inc., King of Prussia, Pa.

Preferably, the ceramic oxide fibers diameter in the range from about 3 to about 25 micrometers; more preferably, from about 4 to about 15 micrometers. Fibers having diameters greater than about 25 micrometers are useful, but fabrics made from such fibers tend to be less efficient for use in filtration applications, and tend to have lower flexibility than those made with smaller diameter fibers. Fibers having a diameter less than about 3 micrometers may also be useful but tend to be avoided because of the small diameter.

Although the fibers used to prepare the fabric can be sized or unsized, the fibers are typically available in their as-received condition with a size coating present. Typically, continuous fibers are treated with organic sizing materials during their manufacture to provide lubricity and to protect the fiber strands during handling. It is believed that the sizing tends to reduce breakage of fibers and reduce static electricity during handling and processing steps. When making a non-woven fabric by wet-lay methods, the sizing tends to dissolve away. Sizing also can be removed after fabrication of the fabric at high temperatures (i.e., 300° C). Preferably, the sizing is removed before applying the vermiculite to the fabric.

It is within the scope of the present invention for the fabric to employ one of several types of fiber, including utilizing fibers of different compositions. Typically, the fabric comprises at least 75 percent by volume (preferably at least 90, 95, or even 1 00 percent by volume) ceramic oxide fiber, based on the total fiber volume of the fabric.

Preferably, the fabric has a thickness in the range from about 0.2 mm (0.008 inch) to about 1.3 mm (0.05 inch), or, in another aspect, expressed as weight per unit area, as from about 271 g/m² (8 oz/yd²) to about 847 g/m² (25 oz/yd²). Generally, fabrics less than about 0.2 mm tend to be weak and not wear as well as heavier fabrics. Fabrics exceeding about 1.3 mm in thickness tend to be excessively expensive, and have a lower permeabilities than the lighter weight fabrics.

The fabric can comprise up to about 25 percent by weight (based on the total weight of the fabric) fugitive material (e.g., heat fugitive materials such as thermoplastic, nylon, and rayon fibers, powders, films, and webs, and water soluble materials such as polyvinyl alcohol). Fugitive fibers or particles can be burned or dissolved out of the fabric to provide a desired structure or porosity. Fugitive materials can be incorporated into the fabric using conventional techniques including soaking or spraying the fabric with fugitive material. Binders can be incorporated into the fabric, for example, by saturating or spraying the fabric with binder.

Vermiculite is a hydrated magnesium aluminosilicate, micaceous mineral found in nature as a multilayer crystal. Vermiculite typically comprises by (dry) weight, on a theoretical oxide basis, about 38–46% $SiO_2$, about 16–24% $MgO$, about 11–16% $Al_2O_3$, about 8–13% $Fe_2O_3$, and the remainder generally oxides of K, Ca, Ti, Mn, Cr, Na, Ba, etc. "Exfoliated" vermiculite refers to vermiculite that has been treated, chemically or with heat, to expand and separate the layers of the crystal, yielding high aspect ratio vermiculite platelets. These platelets can be ground up to produce small particulate, typically ranging in size (i.e., length and width) from about 0.3 micrometer to about 100 micrometers, with a mean size of about 20 micrometers. The thickness of the platelet typically ranges from about 10 Angstroms to about 4200 Angstroms. In another aspect, the vermiculite platelets may have a bi-modal distribution of particle sizes.

The vermiculite can be applied to the fabric by dispersing vermiculite particulate in a liquid medium (typically water), and applying (e.g., coating) the dispersion onto the fabric. Aqueous vermiculite particle dispersions are available, for example, from W. R. Grace of Cambridge, Mass., under the trade designation "MICROLITE 963". The desired concentration of the dispersion can be adjusted by removing or adding liquid media thereto.

It is preferred that any sizing present on the fibers of the fabric be removed before the vermiculite is applied. The sizing can be removed conventional techniques including heating the fabric to burnoff or decompose the size material (e.g., heating the fabric for 24 hours at a temperature in the range from about 204° C. (400° F.) to about 400° C. (750° F.)). Removal of the sizing is believed to increase the wetting of the fibers by the dispersion, as well as to contribute to the homogeneity of the resulting vermiculite coating.

The vermiculite can be applied to the fabric using conventional techniques such as dip coating, spray coating, and brush coating. Preferably, the vermiculite is "worked into" or uniformly distributed into the fabric. For example, the vermiculite can be forced into the fabric by pressure (e.g., by using a conventional hand held roller; by hand flexing the coated fabric back and forth; and/or by passing the vermiculite coated fabric between two opposed rolls positioned, or capable of being positioned, such that the gap therebetween is less than the thickness of the coated fabric). Optionally, the vermiculite dispersion can be heated to a temperature below the boiling point of the liquid media before it is applied to the fabric. Further, the coated fabric can be at an elevated temperature (e.g., a temperature at or above the boiling point of the liquid media in the dispersion) before, and/or while the pressure is being applied.

A preferred method for coating the fabric is to dip the fabric into a vermiculite dispersion for at least several seconds, remove the fabric from the dispersion, allow excess dispersion material to drain off, and then dry the coated fabric, for example, in an oven (e.g., at 110° C. for 2 hours). After drying, the resulting filter material is ready for use.

In another method for making fabric material according to the present invention, vermiculite can be applied to the fabric using conventional techniques, and prior to drying, the vermiculate coated fabric can be run between two opposed rolls positioned, or capable of being positioned, such that the gap therebetween is less than the thickness of the coated fabric. Preferably, the coated fabric is at an elevated temperature (e.g., a temperature at or above the boiling point of the liquid media in the dispersion) before, and/or while it is passed between the rolls.

Although not wanting to be bound by theory, it is believed individual coating of the fibers with the vermiculite is preferred as compared to vermiculite coatings were there is bridging of vermiculite or the like (e.g., a film) between individual fibers.

Filter material according to the present invention is useful, for example, for the removal of entrained particulate from fluid streams. The filter material can be incorporated into conventional filter constructions including hot gas filters and filter bags (see, e.g., U.S. Pat. No 3,884,659 (Ray), the disclosure of which is incorporated herein by reference). A particularly useful filter utilizing fabric material according to the present invention is a bag filter in the shape of a tube. Typically, bag filters range in diameter from about 10 cm to about 31 cm, and in length from about 1.2 meters to about 9 meters, although other sizes may also be useful, depending upon the particular use requirements and bag construction. A tubular filter bag is typically made from filtration fabric cut to the appropriate length and width for the desired filter bag. Preferably, any sizing present on the fabric is removed prior to treating the fabric with vermiculite. The fabric can be sewn lengthwise to form a tube before or after the vermiculite treatment. A cuff may be sewn on one or both ends, and a closing cap may be sewn on one end. Metal rings for attachment and support may be added. The finished bag is attached to a support structure, which forms a seal between the clean and dirty sections of a "baghouse". A baghouse is a filtering apparatus having a multiplicity of tubular filter bags mounted in a filter housing. The filtering apparatus allows for the removal of dust or particulate entrained in a fluid (e.g., hot gas) stream. Each filter bag has a tubular supporting frame or cage which holds the filter bag in an open tubular configuration. A particulate-laden gas stream flows into the bag and the particulate gradually becomes deposited on the exterior surface of the filter bag, due to the flow of gas from the outside to the inside of the bag.

Baghouses are typically equipped with a dust removal hopper. The accumulated particulate on the outside of the bag is removed by mechanical shaking or by reverse jet flow (i.e., a burst of pressurized air applied to the opening in the bag, causing the bag to billow out, resulting in dislodgment of particulate from the bag surface). The interval between cleanings can be a few minutes to hours, depending upon the rate of particulate collection.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES 1–4 AND COMPARATIVE EXAMPLE I

Glass fabric (722 g/m² (21.3 oz/sq yd), 3×1 twill, 48×40 yarn count, texturized fill, filament size "DE", nominal 6 micrometer diameter; available under the trade designation "E GLASS" from Owens-Corning Fiberglas Corp. of Toledo, Ohio) was heated at 400° C. for 1 hour in a conventional oven to burn off the sizing present on the as-received fabric.

Vermiculite dispersions of 1%, 2%, 2.5% and 3% by weight vermiculite were prepared by diluting a commercially available vermiculite dispersion (7.5% solids in water; viscosity of 550 cps; mean particle size of about 20 micrometers; available under the trade designation "MICROLITE 963" from W. R. Grace of Cambridge, Mass.) with deionized water. The as-received fabric was cut into 17.8 cm×50.8 cm (7 in ×20 in) pieces which were coated with one of the vermiculite dispersions as follows. The fabric was placed into the vermiculite dispersion then repeatedly folded back and forth on itself for about 10 seconds (i.e., the top major surface of the fabric was folded back upon itself at an angle of about 180°, unfolded, then folded back, etc.). The fabric was turned over and again dipped and folded in the vermiculite dispersion for about 10 seconds. The coated fabric was then dried at 110° C. for two hours.

The gas permeability of the vermiculite-coated fabrics were determined using ASTM D737-75 ("Standard Test Method for Air Permeability of Textile Fabrics"), incorporated herein by reference, wherein a suction fan drew air though a known area of fabric defined by a circular orifice (6 mm in diameter) and a vertical manometer measured the rate of air flow though the test area of fabric. The sample to be tested was clamped into the test apparatus (i.e., into a rubber-faced specimen holder) assuring that it was free of tension. The motor to the test apparatus was started and its speed slowly adjusted using the rheostat to maintain the oil level in the inclined manometer at 12.5 mm (0.5 in.). The oil level in the vertical manometer was recorded. If while at an oil level of 12.5 mm (0.5 in.) on the inclined manometer, the oil level in the vertical manometer was off scale (i.e., either high or low) the size of the circular orifice was changed as appropriate.

The gas permeability was calculated by measuring the rate of flow of air passing through the test area of the sample from the level of oil in the vertical manometer. The gas permeability of a heat cleaned (i.e., 400° C. for 1 hour) fiberglass fabric ("E GLASS") having no vermiculite on it was also measured. The gas permeability values, which are based on an average of three runs, are reported in Table 1, below.

TABLE 1

| Example | Conc. of vermiculite dispersion. wt. % | Gas permeability l/min/cm² (CFM/ft²) | |
|---|---|---|---|
| Comp. I | — | 0.89 | (29) |
| 1 | 1% | 0.89 | (29) |
| 2 | 2% | 0.77 | (25) |
| 3 | 2.5% | 0.74 | (24) |
| 4 | 3% | 0.34 | (11) |

The flexural endurance of Examples 1–4 and Comparative Example I was evaluated as described in ASTM D-2176-89 ("Standard Test Method for Folding Endurance of paper by the M.I.T. Tester"), incorporated herein by reference, using a 1 kg load. This test, which is designed to simulate the flexing that filter bags experience during the cleaning cycle, involved successively folding the sample until failure (i.e., until all the yarns in the fill direction broke).

More specifically, the flexural endurance of Examples 1–4 and Comparative Example I was evaluated using a Tinius Olson M.I.T. Folding Endurance Tester (available from Tinius Olson of Willow Grove, Pa.). Samples of each example were cut into 1.9 cm (0.75 inch) by 11.43 cm (4.5 inch) pieces. The fabric ("E GLASS" was unraveled to 1.25 cm (0.5 in) in width (11 fill yarns wide). For each sample, the bottom oscillating folding head (jaw) of the tester was rotated so that its opening was vertical. The fold counter was set at zero. One end of the sample was clamped firmly and squarely into the top head of the tester. The plunger was depressed into the position corresponding to a one kilogram dead weight load. Without touching the portion of the sample to be folded, the bottom of the sample was clamped firmly and squarely into the bottom head of the tester, with the sample lying flat, and without either side of the sample touching toughing the oscillating head mounting plate. The sample was folded through an angle of 135°, and at a uniform rate of 175±25 double folds/min until failure.

In addition, the flexural endurance of Examples 1–4 further heat treated at 316° C. or 425° C. for 15 minutes were also evaluated to at least in part simulate in-use conditions for the fabric. Under some conditions, heat treatment can contribute to the strength of the fabric; alternatively, heat can also cause the fibers in the fabric to be have reduced strength. The results of the flexural endurance tests are shown in Table 2, below.

TABLE 2

| Example | Conc. of vermiculite dispersion, wt. % | Heat treatment, °C. | Flexural endurance, number of double folds |
|---|---|---|---|
| Comp. I | — | — | 16 |
| 1 | 1% | 110 | 66 |
| 1A | 1% | 316 | 59 |
| 1B | 1% | 425 | 15 |
| 2 | 2% | 110 | 318 |
| 2A | 2% | 316 | 406 |
| 2B | 2% | 425 | 104 |
| 3 | 2.5% | 110 | 622 |
| 3A | 2.5% | 316 | 362 |
| 3B | 2.5% | 425 | 229 |
| 4 | 3% | 110 | 936 |
| 4A | 3% | 316 | 892 |
| 4B | 3% | 425 | 662 |

EXAMPLES 5 and 6

A 46 meter (50 yds) long by 1.24 meter (49 in) wide piece of glass fabric (722 g/m² (21.3 oz/sq yd), 3×1 twill, 48×40 yarn count, texturized fill, filament size "DE", nominal 6 micrometer diameter; available under the trade designation "E GLASS" from Owens-Corning ) was heat cleaned in a conventional oven for 24 hours at 204° C. and 24 hours at 371° C. to remove the sizing present on the as-received fabric. The heat-cleaned fabric was threaded into a dip coating machine equipped with a 9.1 meter (30 ft) tall vertical drier. Twenty three meters (25 yds) of the fabric was fed into a coating tray filled with a 1.7% vermiculite dispersion (prepared by diluting a commercially available vermiculite dispersion ("MICROLITE 963") with deionized water), and passing underneath a 10 cm (4 in) diameter stainless steel roll located at the bottom of the coating tray, the roll being completely submerged in the dispersion. The fabric exited vertically from the dispersion, passing through two coating knives set at a gap of 0.96 mm (0.038 inch), and then continuing into the bottom of the vertical drier. The bottom section of the vertical drier was at a temperature of about 107° C., the top section at about 177° C. The fabric passed through the drier over a top roller, then back down through the drier, and then exited the drier and was wound on a core. The web speed was 91 m/hr (100 yds/hr).

Example 6 was prepared as described for Example 5 (above), except the concentration of the dispersion was 2% vermiculite.

The gas permeabilities of the Example 5 and 6 vermiculite-coated fabrics were 1.25 l/min/cm² and 1.28 l/min/cm², respectively. The gas permeability of the heat cleaned fabric (without the vermiculite coating) was 1.13 l/min/cm², and the flexural endurance value was 16 double folds.

The flexural endurance of Examples 5 and 6, as well as samples of these examples further heat treated at 316° C. or 425° C. for 15 minutes are reported in Table 3, below.

TABLE 3

| Example | Conc. of vermiculite dispersion, wt % | Additional Heat treatment, °C | Flexural endurance, number of double folds |
| --- | --- | --- | --- |
| 5 | 1.7 | — | 182 |
| 5A | 1.7 | 316 | 54 |
| 5B | 1.7 | 425 | 30 |
| 6 | 2 | — | 204 |
| 6A | 2 | 316 | 57 |
| 6B | 2 | 425 | 23 |

EXAMPLES 7–10

A 61 cm (24 inches) long by 18 cm (7 inches) wide piece of glass fabric (722 g/m² (21.3 oz/sq yd), 3×1 twill, 48×40 yarn count, texturized fill, filament size "DE", nominal 6 micrometer diameter; available under the trade designation "E GLASS" from Owens-Corning ) was heat cleaned in a conventional oven for about 1 hour at 400° C. to remove the sizing present on the as-received fabric. Vermiculite dispersions of 1%, 1.67%, 2% and 2.5% by weight vermiculite were prepared by diluting a commercially available vermiculite dispersion ("MICROLITE 963") with deionized water. Heat-cleaned fabric was dipped in a tray filled with one of the vermiculite dispersion for about 20 seconds. The fabric was removed from the dispersion, and excess dispersion was allowed to drain off for about 5 seconds. The soaked fabric was then placed between two sheets of silicone coated paper and fed into laboratory scale laminator. The temperature of the laminator's nip rolls was set at 115.5° C. (240° F.). The gap between the rolls was slightly less than the combined thickness of the paper/fabric/paper. The roll pressure was at approximately 34.5 kPa (5 psi). For the 1% vermiculite dispersion example (i.e., Example 7), the paper/fabric/paper sandwich was passed through two heated nip rolls five times. For the 1.67%, 2%, and 2.5% vermiculite dispersion examples (i.e., Examples 8, 9, and 10, respectively), the paper/fabric/paper sandwiches were passed through two heated nip rolls nine times for each example. The fabric was then allowed to completely dry at room temperature.

The flexural endurance of Examples 7–10, as well as samples of these examples further heat treated at 316° C. for 15 minutes are reported in Table 4, below.

TABLE 4

| Example | Conc. of vermiculite dispersion, wt % | Additional Heat treatment, °C | Flexural endurance, number of double folds |
| --- | --- | --- | --- |
| 7 | 1 | — | 218 |
| 7A | 1 | 316 | 131 |
| 8 | 1.67 | — | 513 |
| 8A | 1.67 | 316 | 312 |
| 9A | 2 | — | 580 |
| 9A | 2 | 316 | 287 |
| 10 | 2.5 | — | 639 |
| 10A | 2.5 | 316 | 417 |

EXAMPLE 11 AND COMPARATIVE EXAMPLE II

This example illustrates the flex performance of filter bags made from the fabric of this invention in a simulated baghouse test.

Two 50.8 cm (20 inch) by 152.4 cm (60 inch) pieces of fiberglass fabric (fabricated from "S2 GLASS" yarns, and commercially available from Clark-Schwebel of White Plains, N.Y., as Style 6781; 8-Harness Satin, 57×54 yarn count, 306 g/m² (8.90 oz/yd²); no texturized yarns) were each sewn into filter bags 1.22 meters (4 feet) long and 11.7 cm (4.62 inch) in diameter using quartz thread (Q-18; commercially available under the trade designation "ASTROQUARTZ" from J. P. Stevens, Inc.) to provide a conventional french felled seam having 2 stitches per cm (5 stitches per inch). The bags were heat cleaned at 315° C. (600° F.) for 1 hour. The heat-cleaned bags were dipped into a 1.67% by weight vermiculite dispersion (diluted with deionized water from "MICROLITE 963"). The vermiculite dispersion was worked into the fabric using a hand held rubber roller. The resulting vermiculite-coated bags were dried at 93.3° C. (200° F.) for 4 hours. The resulting bags (Example 8) were installed on wire cages for testing in a baghouse.

The baghouse testing was run for 400 hours at a temperature of 493° C. Each bag was subjected to a repeated pulse (2–5 pulses/minute) of room temperature air at pressure of 420 Pa (60 psi) down the center of the bag to simulate the type of pulsing done in actual use conditions to clean filter bags.

Two other bags (Comparative Example II) were prepared as described for Example 8 except for the addition of vermiculite.

The Comparative Example II bags each failed after not more than 112,000 pulses. The Example 8 bags, however, did not fail even after 333,000 pulses.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A filter material comprising fabric of ceramic oxide fibers and vermiculite particulate, said fibers collectively having an outer surface, at least a portion of said outer surface being covered by a sufficient amount of vermiculite particulate such that said filter material has an increased flexural endurance over the fabric without the presence of said vermiculite of at least 100 percent, said filter material having a gas permeability of at least 0.15 l/min/cm².

2. The filter material according to claim 1 wherein said fabric comprises at least 75 percent by volume of said ceramic oxide fiber, based on the total fiber volume of said fabric.

3. The filter material according to claim 2 wherein said filter material has an increased flexure endurance over the fabric without the presence of said vermiculite of at least 200 percent.

4. The filter material according to claim 3 wherein said filter material has an increased flexure endurance over the fabric without the presence of said vermiculite of at least 500 percent.

5. The filter material according to claim 4 having a gas permeability of at least 0.3 l/min/cm$^2$.

6. The filter material according to claim 5 having a gas permeability of less than 1.5 l/min/cm$^2$.

7. The filter material according to claim 5 having a gas permeability of less than 0.8 l/min/cm$^2$.

8. The filter material according to claim 5 having a gas permeability in the range from 0.3 to 2 l/min/cm$^2$.

9. The filter material according to claim 5 having a gas permeability in the range from 0.3 to 0.8 l/min/cm$^2$.

10. The filter material according to claim 5 wherein the vermiculite particulate have lengths and widths each in the range from about 0.3 micrometer to about 100 micrometers, and thicknesses ranging from about 10° A to about 4200° A.

11. The filter material according to claim 5 wherein said ceramic oxide fibers are selected from the group consisting of glass fibers, alpha alumina fibers, aluminosilicate fibers, zirconia fibers, and combinations thereof.

12. The filter material according to claim 5 wherein said ceramic oxide fibers are aluminoborosilicate fibers.

13. The filter material according to claim 5 wherein said ceramic oxide fibers are crystalline ceramic oxide fibers.

14. The filter material according to claim 5 wherein said ceramic oxide fibers are glass fibers.

15. The filter material according to claim 14 wherein said glass fibers comprise by weight, on a theoretical oxide basis, $SiO_2$ in the range from about 64 to about 66 percent, $Al_2O_3$ in the range from about 24 to about 26 percent, MgO in the range from about 9 to about 11 percent, based on the total oxide content of said fibers.

16. The filter material according to claim 15 wherein said glass fibers are made of glass having a softening point of about 860° C.

17. The filter material according to claim 14 wherein said glass fibers comprise by weight, on a theoretical oxide basis, $SiO_2$ in the range from about 52 to about 56 percent, $Al_2O_3$ in the range from about 12 to about 16 percent, CaO in the range from about 16 to about 25 percent, up to about 5 percent MgO, $B_2O_3$ in the range from about 5 to about 10 percent, based on the total oxide content of said fibers.

18. The filter material according to claim 14 wherein said glass fibers are made of glass having a softening point in the range from about 600° C. to about 875° C.

19. The filter material according to claim 5 wherein said fabric is woven.

20. A filter bag comprising filter material according to claim 5.

21. The filter material according to claim 2 wherein said filter material has an increased flexure endurance over the fabric without the presence of said vermiculite of at least 1000 percent.

22. The filter material according to claim 2 wherein said filter material has an increased flexure endurance over the fabric without the presence of said vermiculite of at least 5000 percent.

* * * * *